US008804691B1

(12) United States Patent
Zhao et al.

(10) Patent No.: US 8,804,691 B1
(45) Date of Patent: Aug. 12, 2014

(54) PHASE BASED PREAMBLE DETECTION

(75) Inventors: Qing Zhao, Milpitas, CA (US); Chuxiang Li, Santa Clara, CA (US); Leilei Song, Sunnyvale, CA (US); Jungwon Lee, Cupertino, CA (US)

(73) Assignee: Marvell International Ltd. (BM)

( * ) Notice: Subject to any disclaimer, the term of this patent is extended or adjusted under 35 U.S.C. 154(b) by 793 days.

(21) Appl. No.: 12/540,758

(22) Filed: Aug. 13, 2009

Related U.S. Application Data

(60) Provisional application No. 61/089,584, filed on Aug. 18, 2008.

(51) Int. Cl.
*H04L 27/26* (2006.01)
*H04W 56/00* (2009.01)
*H04W 88/02* (2009.01)

(52) U.S. Cl.
CPC ........... *H04L 27/2659* (2013.01); *H04W 56/00* (2013.01); *H04W 88/02* (2013.01)
USPC ............ 370/350; 375/260; 375/362; 375/365

(58) Field of Classification Search
CPC ..................................................... H04L 27/266
USPC ......................... 370/332; 375/362; 455/277.1
See application file for complete search history.

(56) References Cited

U.S. PATENT DOCUMENTS

| | | | | |
|---|---|---|---|---|
| 2002/0168955 | A1* | 11/2002 | Wildhagen | 455/277.1 |
| 2005/0175114 | A1* | 8/2005 | Jones et al. | 375/260 |
| 2008/0062933 | A1* | 3/2008 | Liu et al. | 370/332 |
| 2008/0107200 | A1 | 5/2008 | Zhu et al. | |
| 2008/0107220 | A1 | 5/2008 | Park et al. | |
| 2008/0137527 | A1 | 6/2008 | Bick et al. | |
| 2009/0003471 | A1 | 1/2009 | Bick et al. | |
| 2009/0067517 | A1 | 3/2009 | Hung et al. | |
| 2009/0154627 | A1* | 6/2009 | Park et al. | 375/365 |
| 2009/0175394 | A1* | 7/2009 | Park et al. | 375/362 |

OTHER PUBLICATIONS

NTT DoCoMo "SCH structure and cell search method for E-UTRA downlink", R1-061186, May 8-12, 2006, entire document.*

P802.16Rev2/D4, IEEE Computer Society, Apr. 2008, entire document.*

* cited by examiner

*Primary Examiner* — Joseph Bednash

(57) ABSTRACT

Devices, methods, and other embodiments associated with phase based preamble detection are described. In one embodiment, an apparatus includes a wireless transceiver, an evaluation logic, and a configuration logic. The wireless transceiver receives a wireless signal from a wireless device. The wireless signal includes a preamble sequence. The evaluation logic evaluates the preamble sequence by comparing phases of the preamble sequence to phases of predefined preamble sequences to identify a matching preamble sequence. The comparison is done without using amplitude information. The configuration logic configures the wireless transceiver to synchronize wireless communications with the wireless device based, at least in part, on the matching preamble sequence.

20 Claims, 5 Drawing Sheets

PHASE BASED PREAMBLE DETECTION

CROSS REFERENCE TO RELATED APPLICATIONS

This application claims the benefit of U.S. provisional application Ser. No. 61/089,584, filed on Aug. 18, 2008, which is hereby incorporated by reference.

BACKGROUND

Wireless networks are used to transmit data to wireless devices. Wireless networks often transmit data from a base station to a mobile device. To increase the amount of data a base station can transmit, the base station may transmit multiplexed data. The data may be multiplexed according to a standard such as the Worldwide Inter-operability for Microwave Access (WiMAX) standard that is based on the International Electrical and Electronic Engineers (IEEE) 802.16.x standard.

A base station operating according to the IEEE 802.16 standard uses orthogonal frequency division multiple access (OFDMA) signals to communicate data to mobile devices associated with the base station. Using OFDMA signals improves the rate of transmission between the base station and the mobile devices associated with the base station. An OFDMA signal is comprised of multiple subcarriers that are modulated at a symbol rate equal to the reciprocal of the frequency separation between two adjacent subcarriers. To reduce interference between multiple base stations transmitting OFDMA signals, neighboring base stations within a network are assigned different predetermined/predefined preamble sequences that have different data patterns. In one example, a base station operating in a 512-fast Fourier transform (FFT) mode may be assigned to one of 114 different preamble sequences. Adjacent base stations are assigned different preamble sequences to reduce interference between them.

The preamble sequence is sent from the base station as the first signal that the mobile device will receive upon the mobile device entering the broadcast range of the base station. The preamble sequence enables the mobile device to synchronize with the base station in order to transmit and receive frames of data with the base station. When the mobile device is within the range of more than one base station, the preamble sequences from different base stations may use the same frequencies and interfere with one another to cause a low signal to noise ratio (SNR). During signal acquisition with a particular base station, an OFDMA receiver in a wireless device does not know what preamble, frequency offsets, and/or timing offsets are associated with the signals transmitted by the base station. Therefore, the mobile device will need to account for uncertainties of preamble, frequency, and time at an SNR below zero. Searching for these unknowns at the same time may result in a high error rate and the correct preamble sequence may be difficult to determine. Therefore, a better way of identifying a preamble sequence would be desirable.

SUMMARY

An embodiment includes an apparatus. The apparatus includes a wireless transceiver, an evaluation logic, and a configuration logic. The wireless transceiver receives a wireless signal from a wireless device. The wireless signal includes a preamble sequence. The evaluation logic evaluates the preamble sequence by comparing phases of the preamble sequence to phases of predefined preamble sequences to identify a matching preamble sequence. The comparison is done without using amplitude information. The configuration logic configures the wireless transceiver to synchronize wireless communications with the wireless device based, at least in part, on the matching preamble sequence.

An embodiment includes a method. The method receives a first signal from a first base station at a mobile device. The first signal includes a first preamble sequence. The first preamble sequence is evaluated by comparing phase information of the first preamble sequence to phase information of predefined preamble sequences to determine a possible matching preamble sequence without using amplitude information. The mobile device is configured based, at least in part, on the possible matching preamble sequence to transmit and receive information with the first base station.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
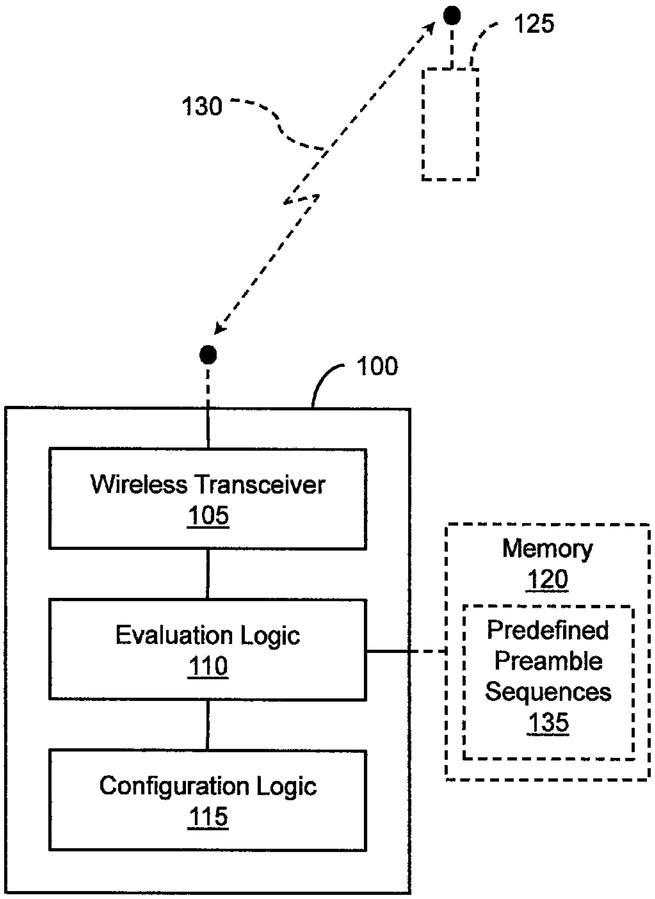
FIG. 1 illustrates an embodiment of an apparatus associated with phase based preamble detection/identification.

Described herein are example methods, and other embodiments associated with phase based preamble detection/identification. In one embodiment, a mobile device is configured to receive a preamble sequence upon entering a transmission range of a base station. The preamble sequence may correspond to a stream of data symbols that represent the preamble sequence. The mobile device compares phase information of the preamble sequence to the phase information of a group of predefined preamble sequences. In one embodiment, the phase information may correspond to the phase information of constellation diagrams of the data symbols. The phase information may correspond to the angle a symbol plotted on the constellation diagram makes with respect to an origin of a real and imaginary axis of the constellation diagram. The mobile device is configured to select a preamble sequence by matching the preamble sequence to one of the group of predefined preamble sequences based, at least in part, on the compared phase information. The mobile device can then synchronize communications with the base station based, at least in part, on the selected preamble sequence. The mobile device is able to match the preamble sequence to a predefined preamble sequence without basing the matching on amplitude values of the preamble sequence, which can save time. By not matching the preamble sequence based on amplitude information the calculations used to implement a matching scheme are simplified. Additionally, the amount of logic needed to implement the calculations can be reduced.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to “one embodiment”, “an embodiment”, “one example”, “an example”, and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase “in one embodiment” does not necessarily refer to the same embodiment, though it may.

“Computer-readable medium”, as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

“Logic”, as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), at least one circuit, an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus that is configured to detect and/or identify a preamble using phase information. In one example, the apparatus may be implemented in a wireless mobile device 100 that can communicate with a network via a base station 125. When the mobile device 100 enters an area covered by the base station 125, the mobile device 100 attempts to configure its signal communications to be compatible with the base station 125. For example, the signals from the mobile device 100 are synchronized with signals sent by the base station 125. The speed and format that the base station 125 uses to transmit signals is determined from a preamble associated with the signals sent by the base station 125. For example, the IEEE 802.16 standard includes 114 different predefined preambles when an operation is performed in a 512-fast Fourier transform (FFT) mode. A base station operating according to the IEEE 802.16 standard may be assigned to use one of the 114 predefined preamble sequences. Of course, other type of preamble sequences may be predefined. One issue is that the assigned preamble sequence is initially unknown to a mobile device 100.

When the mobile device 100 is turned on or enters a transmission area within range of the base station 125, the mobile device 100 attempts to determine and/or identify the preamble sequence that is associated with the base station 125. The mobile device 100 is configured to make the determination by receiving a preamble sequence and comparing phase information of the received preamble sequence with phase information from known preamble sequences within a group of predefined preamble sequences. The predefined preamble sequences may be pre-stored in a memory within the mobile device 100. In another example, the predefined preamble sequences may be read or received by the mobile device 100 from an external memory 120 that contains predefined preamble sequences 135.

In one embodiment, the mobile device 100 is configured to determine and identify the preamble sequence without basing the determination on amplitude information. Although some amplitude information may be calculated if desired (e.g. magnitudes of amplitudes), the determination process can be made faster because not all magnitudes are calculated and the amplitude information is ignored during the determination. Thus, logic to compare amplitudes does not need to be implemented, which may reduce costs.

Rather than comparing amplitude information, the mobile device 100 compares phase information from the received unknown preamble to phase information from the predetermined preamble sequences. The phase information that compares or matches well with the phase information of the received preamble sequence is determined to be the matching predetermined preamble sequence. In one embodiment, the mobile device 100 performs the matching operation, at least in part, in the frequency domain.

In one embodiment, the mobile device 100 is implemented with a wireless transceiver 105, evaluation logic 110, and configuration logic 115. The wireless transceiver 105 is configured to receive wireless signals over a wireless communication channel 130 from the base station 125. Wireless signals from the base station 125 typically include a preamble sequence. Initially at the time the preamble sequence is received, the type or identity of the preamble sequence is unknown. By analyzing characteristics of the unknown preamble sequence, the characteristics can be compared to characteristics of known predefined preamble sequences. The comparison can help to identify the unknown preamble sequence. In one embodiment, the predefined preamble sequences may correspond to IEEE 802.16 predefined preamble sequences.

In one embodiment, the evaluation logic 110 is configured to evaluate the unknown preamble sequence by comparing phases of the preamble sequence to phases from sequences of the group of predefined preamble sequences. The comparing may be based on a correlation function as described below. The amplitudes of the preamble sequences are ignored by the evaluation logic 110 when deciding which one of the predefined preamble sequences is the best match. By not comparing amplitude information, the matching may be performed faster and with less hardware.

Figure 2:
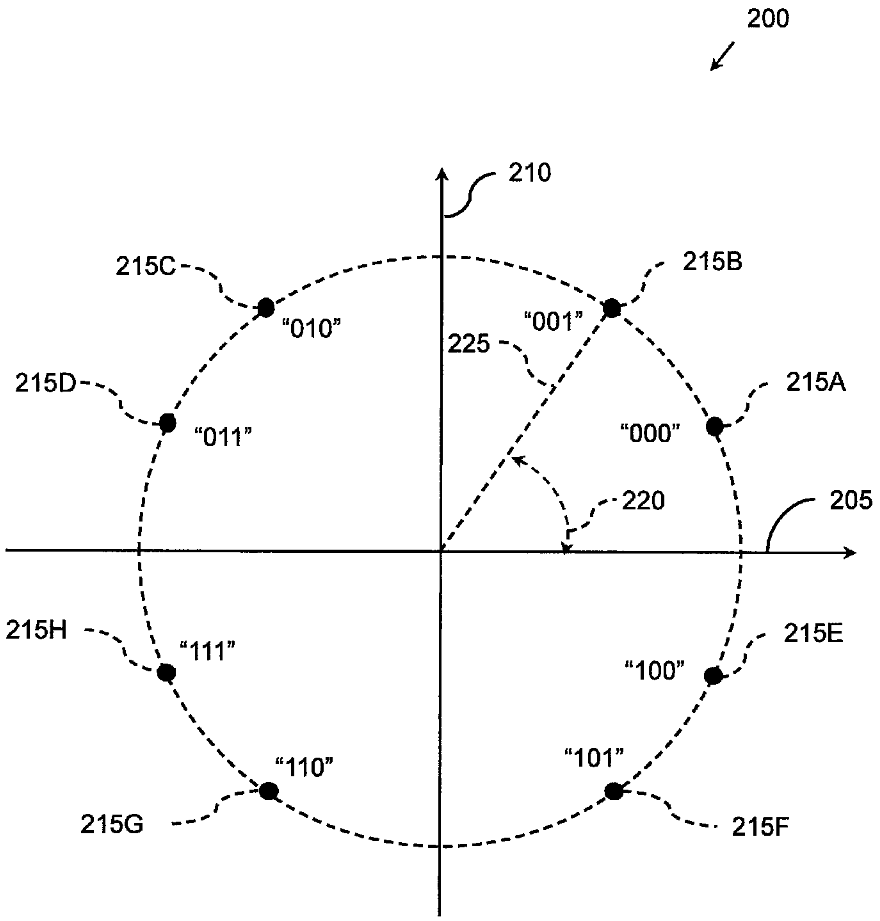
FIG. 2 illustrates one embodiment of a constellation diagram associated with phase based preamble detection/identification.

In one embodiment, the phase comparison can be performed by using a constellation diagram. For example, FIG. 2 represents one embodiment of a constellation diagram 200 that defines and shows how phases and magnitudes are assigned for symbols 215A-H each formed of three bits (e.g., "000", "001", etc. . . . ). The preamble sequence received at the wireless transceiver 105 may comprise a stream of three bit symbols represented as in FIG. 2. In a communication system, the symbols 215A-H are assigned to locations in the constellation diagram 200 so that a receiver may have a good chance of identifying symbols 215A-H that may have drifted due to various sources of noise. For example, the symbol 215A represents the bit values "000", and the symbol 215B represents the bit values "001". The symbols 215C-H represent bit values "010", "011", "100", "101", "110", and "111", respectively. Of course, different numbers of bits and bit assignments may be made and the assignments may be greyscale coded. The symbols 215A-H of FIG. 2 are assigned in a circular arrangement, however, a grid or other assignment patterns are possible as understood by those of ordinary skill in the art based on this disclosure and teachings provided herein. Different numbers of symbols may be assigned to the constellation diagram depending on the communication standard being implemented.

The constellation diagram 200 has a real axis 205 and an imaginary axis 210 that have positive and negative portions passing through an origin. The phase of a symbol is based on an angle that a symbol 215A-H makes with respect to the origin. For example, symbol 215B has a phase based on the angle as indicated by reference label 220. Other symbols have different phases. For example, symbol 215A has a phase that is less than the phase of symbol 215B. In one embodiment, the evaluation logic 110 of FIG. 1 evaluates and/or matches the phases from the received preamble sequence to phases from the predefined preamble sequences. For example, the matching is based on predefined phase assignments for bit patterns (e.g., the phase assignments represented by the constellation diagram 200).

The symbols 215A-H of FIG. 2 also have a magnitude (e.g., amplitude) component. The magnitude of symbol 215B is shown by the line 225 extending from the symbol 215B to the origin of the real and imaginary axes 205, 210. The magnitude has a real component and an imaginary component. The overall magnitudes of the symbols 215A-H of FIG. 2 are all the same because they are an equal distance from the origin. However, if the symbols 215A-H were arranged in a grid pattern, the magnitudes would be different. Although, in some embodiments, some magnitude values may be calculated by the evaluation logic 110 of FIG. 1. However, the magnitude values are not used by the evaluation logic 110 to compare and match the received preamble sequence to the predefined preamble sequences. Not using amplitudes in the matching may speed up the matching process.

With reference again to FIG. 1, once the received preamble sequence is identified by a matched preamble sequence, the configuration logic 115 can synchronize signal communications with the base station 125. This is because the matched preamble sequence should be the same preamble sequence used by the base station 125. In one embodiment, the configuration logic 115 is configured to synchronize communications between the wireless transceiver 105 and the base station 125 based, at least in part, on the matched preamble sequence. The configuration logic 115 then configures the wireless transceiver 105 to transmit data in a timing format that the base station 125 understands.

In other embodiments, the mobile device 100 may be configured in other ways. For example, the mobile device 100 may receive the wireless signal over one wireless communication channel 130 out of several possible wireless communication channels that the base station 125 transmits and receives data on. The wireless transceiver 105 may be configured to receive a wireless signal that is orthogonal frequency-division multiple access (OFDMA) multiplexed and binary phase shift keying (BPSK) modulated.

In one embodiment, when a received signal contains a large carrier frequency offset (CFO), an empty noisy band (empty band), and a partial signal band of a partial preamble sequence may be received by the transceiver 105. The power and amplitude of selected tones from the empty band are normally much less than that from the partial signal band. The effects of the tones from the empty band on determining the preamble sequence are negligible whereas the effects of the partial signal band are more dominant. An incorrect preamble sequence may be identified because it is likely that the partial preamble sequence received may look similar to a portion of a completely different predefined preamble sequence.

As stated previously, phase information of the received preamble sequence is used without using magnitudes (e.g., amplitudes). Magnitude values can be ignored because selected tones from an empty band and a partial signal band of a preamble sequence are assumed to have equal contributions. Phase information may be used without determining amplitude values even when a partial preamble sequence under observation looks similar to a portion of a non-matching preamble sequence. Because the empty and partial bands are equally weighted, the existence of the empty band that is noisy destroys a similarity between the partial preamble sequence and the non-matching preamble sequence thereby preventing a false identification of a wrong predefined preamble sequence.

Suppose that the wireless transceiver 105 receives a first OFDMA symbol of a downlink subframe. The preamble symbol has a preamble identification (ID) that contains information about an IDcell and a segment index. Different preamble symbols may be used when switching from cell to cell and/or switching from segment to segment. A cell may include 3 segments with indexes 0, 1, and 2.

In one embodiment, the evaluation logic 110 matches the preamble sequence to at least one of the predefined preamble sequences after frame synchronization. The preamble sequence is formed with individual preamble symbols. The mobile device 100 will determine preamble symbol boundaries at frame synchronization. If the CFO of the preamble sequence is normalized by subcarrier spacing, the fractional part of CFO (fCFO) can be estimated accurately by a frame synchronization algorithm. The integer part of CFO (iCFO) may remain unknown while the mobile device 100 identifies the preamble sequence. The frequency shift between the shifted preamble sequence and the original preamble sequence is the iCFO.

When the iCFO is large, just a part of the useful subcarriers are identified by the wireless transceiver 105. It may be possible for the mobile device 100 to determine the predefined preamble sequence that the received preamble sequence is associated with when part of the subcarriers are identified and the iCFO is not too large. However, when the iCFO is too large and passes an iCFO threshold, the mobile device 100 may not be able to make an accurate determination. The mobile device 100 may report a failure to identify a preamble sequence when the mobile device 100 cannot identify a predefined preamble sequence that matches the received preamble sequence. The report may be sent to another device that will take a corrective action.

For a small iCFO (less than the bandwidth of a pair of guard bands), a complete preamble sequence can still be identified by the mobile device 100. Guard bands are frequency ranges on both sides of a frequency range the preamble sequence is expected to be transmitted within. If the preamble sequence is within the guard bands, the preamble sequence may still be detected. When the iCFO is small, the evaluation logic 110 may identify both the preamble ID and the iCFO correctly. The preamble ID and iCFO are correctly identified when there is a small iCFO that is less than the bandwidth of a guard band. When there is a small iCFO, the mobile device 100 performs an exhaustive search within a small frequency range to try to find a shifted preamble sequence that was shifted by the iCFO.

In one embodiment, the evaluation logic 110 is configured to determine if a threshold amount of the received preamble sequence is available in a frequency range around the pair of guard bands. In one embodiment, it is unnecessary for the preamble sequence to stay between the pair of guard bands to be detected by the mobile device 100. Additionally, the preamble sequence can at least partially fall outside the guard bands and still be detected. The evaluation logic 110 evaluates the preamble sequence by calculating cross-correlations between the phases of the preamble sequence and the phases of the predefined preamble sequences when the received threshold amount of the preamble sequence has been received at the mobile device 100. The mobile device 100 is configured to report a failure to receive the received threshold amount of the preamble sequence when the received threshold amount of the preamble sequence is not available. The evaluation logic 110 is configured to determine the iCFO when the received threshold amount of the preamble sequence is available.

In one embodiment, ambiguities due to unknown fading channels are removed. The ambiguities are removed from a received preamble sequence prior to the evaluation logic 110 matching the received preamble sequence to one of the predefined preamble sequences. In one embodiment, the evaluation logic 110 is configured to perform differentiation between adjacent subcarriers of the received preamble sequence to remove an ambiguity such as random channel noise. This is performed before calculating cross-correlations between phases of the preamble sequence and the phases of the two or more predefined preamble sequences.

In one embodiment, the received preamble sequence can be modeled according to:

$$Y_k=H_k b_{i,k,m}+n_k$$

where $Y_k$ is a received sample of the preamble sequence at the k-th subcarrier, $b_{i,k,m}$ is the information bit of i-th preamble sequence at the k-th subcarrier having iCFO=m (or m-tone shift), $H_k$ is the complex channel gain at the k-th subcarrier and its phase is uniformly distributed over [0, 2π] and it is assumed the phase is invariant over 4 consecutive subcarriers, and $n_k$ is the background noise at the k-th subcarrier.

Suppose a preamble sequence uses a subset of a total amount of useful subcarriers. For example, alternating third subcarriers are selected for each segment. If the subcarriers with index k, k+3, k+6, etc, belong to one segment, then the subcarriers with index k+1, k+4, k+7, etc. belong to a different segment, and the subcarriers with index k+2, k+5, k+8, etc. belong to yet another segment. In a segment, the distance between two adjacently used subcarriers is a 3 subcarrier spacing.

In one embodiment, the differentiation between adjacent subcarriers used to remove random phase noise can be performed according to:

$$M_k=Y_k Y^*_{k+3}=|H_k|^2 b_{i,k,m} b^*_{i,k,+3,m}+w_k=|H_k|^2 d_{i,k,m}+w_k$$

where $M_k$ is the differential received preamble sequence at the k-th subcarrier, $d_{i,k,m}$ is the information bit of i-th differential preamble sequence at the k-th subcarrier having iCFO=m (the m-tone shift), and $W_k$ is the overall background noise plus interference after differentiation.

In one embodiment, a cross-correlation is calculated between the phases of $M_k$ and the differential preamble sequences and shifted versions of the $M_k$ due to the iCFO. The evaluation logic 110 is configured to calculate cross-correlations between phases of the received preamble sequence and phases of the predefined preamble sequences in the frequency domain. This cross-correlation can be calculated according to:

$$C(i,l)=\frac{\left|\sum_{k\in\Omega(i,l)} e^{j\angle M_k} x e^{j\angle d_{i,k,l}}\right|}{A}=\frac{\left|\sum_{k\in\Omega(i,l)} e^{j\angle M_k} e^{j\angle M_k d_{i,k,l}}\right|}{A}=\frac{\left|\sum_{k\in\Omega(i,l)} \frac{M_k}{|M_k|} d_{i,k,l}\right|}{A}$$

where Ω(i,I) is the subcarrier set for the i-th differential preamble sequence assuming an I-tone shift (e.g., iCFO=I), and A is a normalization coefficient that is a non-zero constant. The search range for iCFO is less than $B_g$ ($|I|<B_g$).

In one embodiment, the evaluation logic 110 is configured to select the preamble ID and iCFO based, at least in part, on a comparison of the correlation values, C(i,I). The correlation values, C(i,I), are compared according to an objective function:

$$(\text{preambleID}, i\text{CFO})=\arg\max_{i,I} C(i,I)$$

$$\text{where: } \max_{i,I} C(i,I)>\text{correlation threshold}$$

In one embodiment, if the selection of the preamble ID and the iCFO is correct, the cross-correlation values reach a maximum value that is greater than the correlation threshold. If neither the preamble ID nor the iCFO is correct, the phase-based cross-correlation is small and the maximum value of the objective function is lower than correlation threshold. When an actual iCFO (or m) between the wireless transceiver 105 and the base station 125 is greater than the range of the iCFO trial (or I), the estimate of the CFO is wrong. When the estimate of the CFO is incorrect and it is very likely that the maximum value of objective function is less than the correlation threshold, the mobile device 100 reports a CFO identification failure. When the actual iCFO (or m) is less than the range of the iCFO trial (or I), it is very likely that both preamble ID and iCFO can be correctly identified.

As discussed above, the evaluation logic 110 is configured to correlate the received preamble sequence to one of the predefined preamble sequences based, at least in part, on phase information. In one example, if the received preamble sequence is to be matched to one of the 114 different predefined preambles (in 512 FFT mode) of the 802.16 standard, 114 correlation values may be calculated. The evaluation logic 110 uses the correlation values to determine which one of the predefined preamble sequences is a match to the received preamble sequence. The evaluation logic 110 selects the predefined preamble sequence with the largest correlation value to be the best match to the received preamble sequence.

The complete preamble sequence or a significant portion of the preamble sequence should be observed at the mobile device 100 in order to identify the received preamble sequence correctly and reliably. A larger search range requires a higher acquisition time than a shorter search range. In one embodiment, the search range can be 16 tones. In another embodiment, the evaluation logic 110 calculates signal correlation values for shifted versions of a tone shift that corresponds to the search range. In one embodiment, the signal correlation values are calculated for shifted versions of a tone shift that corresponds to multiple tones.

The selection of a correlation threshold depends on the cross-correlation characteristics of preamble sequences, the length of preamble sequences, and the selection of normalization coefficient A used to calculate the cross-correlation. The preference in hardware implementation may also impact the selection of the correlation threshold. In one embodiment, the values of the correlation threshold and normalization coefficient A is about 50 percent of the length of the preamble sequence.

Obtaining the phase of the differential received preamble sequence (e.g., $\angle M_k$) at the subcarrier frequencies is computationally expensive in terms of hardware implementation. In one embodiment, the phase of the differential received preamble sequence is determined by a cordic operation on the subcarrier frequencies. In another embodiment, multiplications, square-root, and division computations may be used to determine the phases of the differential received preamble sequence.

One wireless device may receive multiple preamble sequences from a few different but synchronized base stations. The multiple preamble sequences may be transmitted at the same carrier frequency and may use different segments or share a segment. The base station 125 may instruct a mobile device 100 to report the channel quality between the mobile device 100 and a few neighboring base stations. Alternatively, the mobile device 100 itself may want to monitor the channel quality for itself and other base stations. The channel quality may be based, at least in part, on correlation values of the multiple preamble sequences.

Typically the channel quality is represented by preamble carrier-to-interference-plus-noise ratio (PCINR). In one embodiment, an objective function for a preamble sequence in phase-based preamble detection carries information about the PCINR for the base station 125. The phase-based preamble detection can find a few preamble sequences with the largest values of the objective function. The few preamble sequences correspond to base stations with the best channel quality for the mobile device 100.

Figure 3:
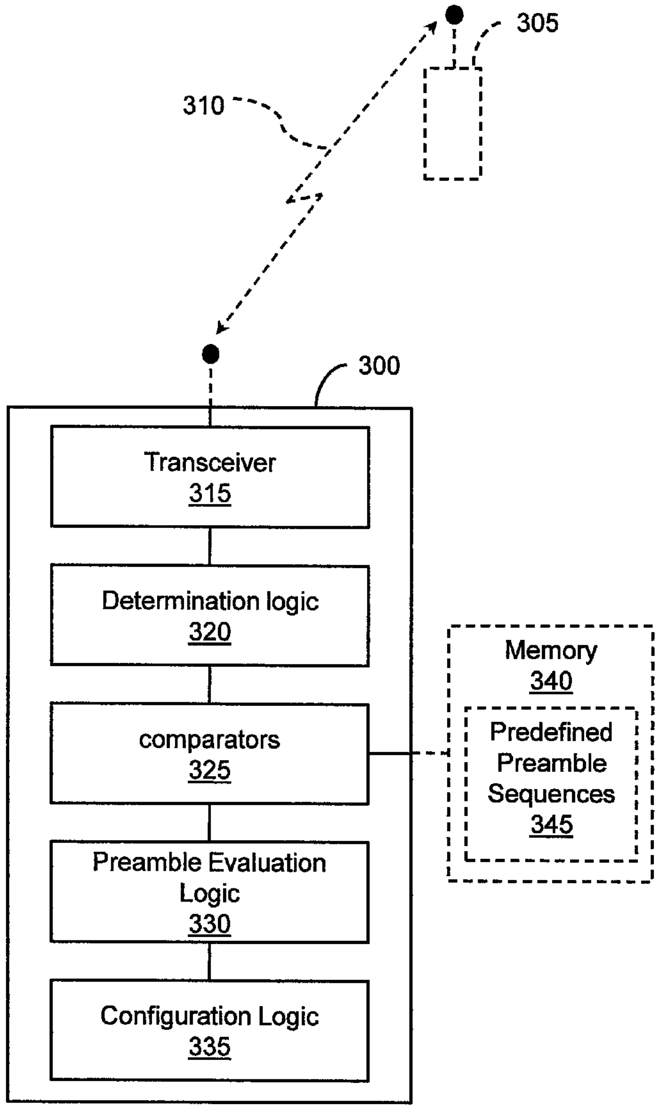
FIG. 3 illustrates another embodiment of an apparatus associated with phase based preamble detection/identification.

FIG. 3 illustrates one embodiment of an apparatus in the form of a mobile device 300 that compares phase information of a received preamble sequence to determine a matching predefined preamble sequence. The mobile device 300 may receive a wireless preamble sequence from a base station 305 or another wireless device over a communication channel 310. The received preamble allows the mobile device 300 to synchronize communication with the base station 305 as previously explained. Amplitude information of the received preamble sequence is not considered when the mobile device 300 compares characteristics of the predefined preamble sequences to identify the received preamble sequence.

The mobile device 300 is implemented with a transceiver 315 configured to receive a preamble sequence from the wireless base station 305. The preamble sequence is comprised of a stream of symbols. As discussed above and in one embodiment, the received preamble sequence may be received in a form of a wireless signal that is orthogonal frequency-division multiple access (OFDMA) multiplexed and binary phase shift keying (BPSK) modulated. When the wireless signal is initially received, the type and/or identity of the received preamble sequence is not known.

In one embodiment, the mobile device 300 is implemented with determination logic 320, comparators 325, preamble evaluation logic 330, and configuration logic 335 configured to process the received preamble sequence and to configure the mobile device 300 to communicate with the base station 305. The determination logic 320 determines phase values of the stream of symbols. In one embodiment, the stream of symbols can be assigned using a constellation diagram similar to the constellation diagram of FIG. 2 discussed above. In one example, when one symbol of the stream of symbols represents three or more bits, the determination logic 320 may compare real sign values, imaginary sign values, imaginary magnitudes, and/or real magnitudes to determine the phase values associated with the stream of symbols.

The comparators 325 compare the phase values of the symbols in the received preamble sequence to the phase values of the symbols in the predefined preamble sequences to produce comparison results. In one embodiment, a memory 340 external to the mobile device 300 may store predefined preamble sequences 345. The mobile device 300 may read the predefined preamble sequences 345 from the memory 340. In another embodiment, predefined preamble sequences are stored internal to the mobile device 300 in memory, tables, and/or registers. The comparators 325 compare the phases on a per symbol basis. The comparison results indicate how closely the phases of the received symbols match the phases of the symbols in the predefined preamble sequences.

For some symbols of the predefined preamble sequences, the symbol phases may match very well; for other symbols, the symbol phases may match very poorly. If the received preamble sequence is determined to correspond to a predefined preamble sequence, the preamble evaluation logic 330 will determine that the received preamble sequence is of the same type and/or identity as the corresponding predefined preamble sequence.

The preamble evaluation logic 330 determines a possible matching preamble sequence from the set of predefined preamble sequences. A preamble sequence is matched to the received preamble sequence based, at least in part, on the comparison results. The preamble evaluation logic 330 may first produce correlation values, as discussed above, for the predefined preamble sequences. The preamble evaluation logic 330 then selects a predefined preamble sequence that best matches the received preamble sequence based, at least in part, on the correlation values.

A threshold can be set for determining the best match. For example, for one of the predefined preamble sequences to match, at least one correlation value from the predefined preamble sequence should meet a correlation threshold. Alternatively, the comparison results may be processed by other correlation techniques or other processes in order to determine a match. As previously discussed, the preamble evaluation logic 330 does not compare amplitude values of the symbols in the received preamble sequence to amplitude values of the symbols in the predefined preamble sequences to determine the possible matching preamble sequence.

In one embodiment, the configuration logic 335 configures the transceiver 315 to synchronize communication with the base station 305 based, at least in part, on the possible matching preamble sequence.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
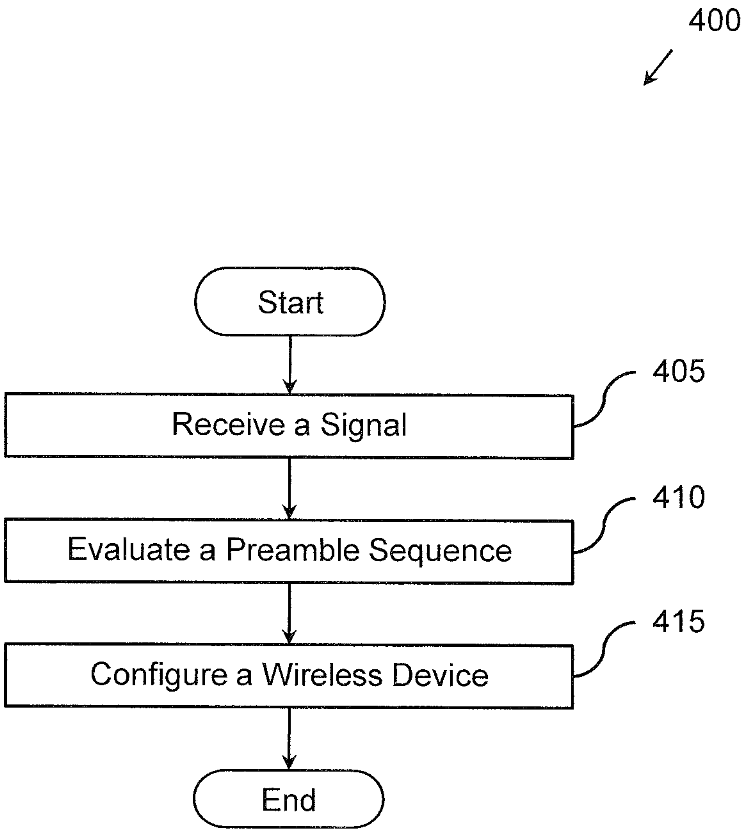
FIG. 4 illustrates an exemplary method associated with phase based preamble detection/identification.

FIG. 4 illustrates an exemplary method 400 associated with phase based preamble determination. The method 400 improves the determination of a wireless preamble sequence by eliminating the need to compare amplitude information of a received preamble sequence to a group of predefined preamble sequences. By comparing phase information without comparing amplitude information, the work involved in performing preamble determination is reduced.

The method 400 begins by receiving, at 405, a signal from a base station at a mobile device. The signal includes a preamble sequence. As discussed above, the signal may be an orthogonal frequency-division multiple access (OFDMA) multiplexed and binary phase shift keying (BPSK) modulated signal.

The received preamble sequence is evaluated, at 410, by comparing phase information of the received preamble sequence to phase information of predefined preamble sequences to determine a possible matching preamble sequence. The possible matching preamble sequence is determined without comparing amplitude information. The evaluating of the received preamble sequence may comprise correlating and/or preprocessing the phase information into another form that increases the probability or finding a possible matching preamble sequence.

The mobile device is configured, at 415, based, at least in part, on the possible matching preamble sequence to transmit and receive information with the base station. A synchronization point in time may be determined by the possible matching preamble sequence. The transmission and reception of information between the mobile device and the base station may then be synchronized to the synchronization point in time.

Figure 5:
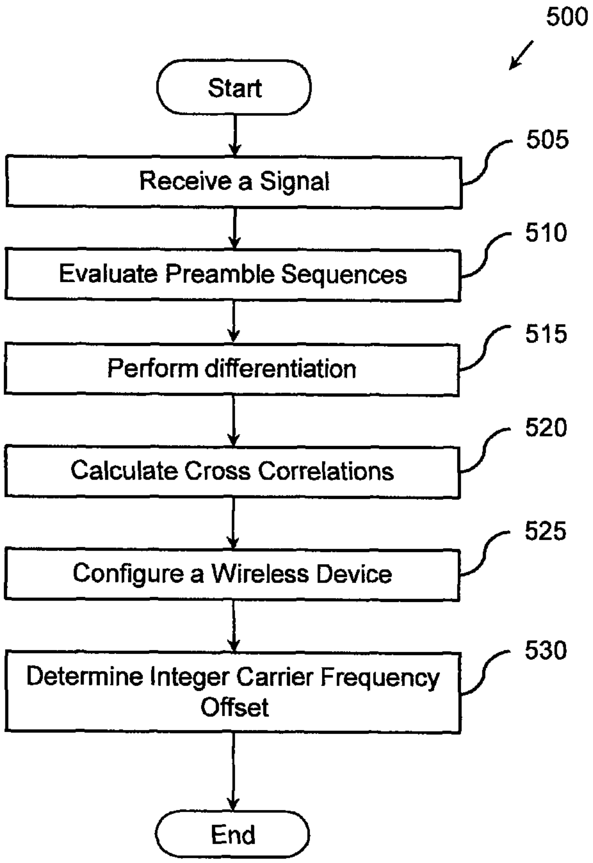
FIG. 5 illustrates another exemplary method associated with phase based preamble detection/identification.

FIG. 5 illustrates another exemplary method 500 associated with determining/identifying a preamble sequence by comparing phase information without comparing amplitude information. Like method 400, a signal from a base station is received, at 505, at a mobile device. The signal includes a received preamble sequence.

The received preamble sequence is evaluated, at 510, by comparing phase information of the received preamble sequence to phase information from one or more of a group of predefined preamble sequences to determine a possible matching preamble sequence. The received preamble sequence is evaluated and a possible matching preamble sequence is determined as in method 400. When the received preamble sequence extends far enough beyond a pair of guard bands, the received preamble sequence will not match one of the predefined preamble sequences and the received preamble sequence is not evaluated.

A differentiation is performed, at 515, between adjacent subcarriers of the received preamble sequence to remove random channel noise and produce differentiated signals. Cross-correlations between phases of the differentiated signals and the group of predefined preamble sequences are calculated, at 520, to produce correlation values. The possible matching preamble sequence is determined based, at least in part, on the correlation values but not the amplitudes. By not matching based on amplitudes, the matching may be performed more rapidly and with less logic. The differentiation and cross-correlation may be performed by the mobile device 100 as discussed above with reference to FIG. 1.

In one embodiment, a correlation value with a large magnitude is selected. The large magnitude corresponds to a predefined preamble sequence in the group of predefined preamble sequences. The large magnitude is selected when the large magnitude exceeds a threshold value. The differentiation, cross-correlation, and other aspects of the method 500 may be preformed, at least in part, in the frequency domain.

The mobile device is configured, at 525, based, at least in part, on the possible matching preamble sequence to transmit and receive information with the base station. The method 500 determines an integer carrier frequency offset (iCFO), at 530, when the received preamble sequence does not extent too far beyond a pair of guard bands. The mobile device may be synchronized based, at least in part, on the iCFO to synchronously communicate with the base station.

In one embodiment, the methods 400 and 500 may be used to identify signal strengths of respective preamble sequences received from a number of base stations. Based on the identified signal strengths, the mobile device is configured to communicate with the optimal base station.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods may be implemented in a semiconductor chip. The methods can also be implemented with circuits.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:

a wireless transceiver configured to receive a wireless signal from a wireless device, wherein the received wireless signal includes a preamble sequence and wherein the received preamble sequence is expected to be received within a frequency range that is between two frequency guard bands;

evaluation logic implemented with at least a circuit or a non-transitory computer-readable medium, configured to evaluate the received wireless signal when the received wireless signal extends outside the frequency range and outside one of the frequency guard bands by:

(i) determining if a threshold amount of the received preamble sequence is available in the frequency range between the two frequency guard bands, and if the threshold amount is not available, then the evaluation logic is configured to report a failure in identifying the received preamble sequence; and (ii) if the threshold amount is available, then (a) comparing phases of the received preamble sequence to phases of a plurality of predefined preamble sequences without using amplitude information from the received wireless signal; and (b) identifying a matching preamble sequence from the plurality of predefined preamble sequences based at least in part on the phase information without using the amplitude information; and configuration logic implemented with at least a circuit or a non-transitory computer-readable medium, configured to configure the wireless transceiver to synchronize wireless communications with the wireless device based, at least in part, on the matching preamble sequence.

2. The apparatus of claim 1, where the evaluation logic is further configured to perform differentiation between adjacent subcarriers of the received preamble sequence to remove random channel noise before calculating cross-correlations between phases of the received preamble sequence and phases of the plurality of predefined preamble sequences.

3. The apparatus of claim 1, wherein when the received wireless signal extends outside the frequency range and into one of the frequency guard bands, then the received wireless signal comprises a partial signal band and an empty noisy band that is received within the frequency range; wherein the evaluation logic is further configured to equally weight the partial signal band and the empty noisy band when comparing phases by using phase information from the partial signal band and the empty noisy band and not using amplitude information.

4. The apparatus of claim 1, where the evaluation logic is further configured to determine an integer carrier frequency offset (iCFO) when the received preamble sequence does not extend beyond the frequency guard band.

5. The apparatus of claim 1, where the evaluation logic is further configured to calculate signal correlation values for shifted versions of a tone shift.

6. The apparatus of claim 1, where the evaluation logic is further configured to compare the phases of the received preamble sequence to the phases of a plurality of predefined preamble sequences without using amplitude information from the received wireless signal when the received wireless signal extends outside the frequency range and into one of the frequency guard bands.

7. The apparatus of claim 1, where the evaluation logic is further configured to correlate the received preamble sequence to the plurality of predefined preamble sequences based, at least in part, on the phase information of the received preamble sequence and phases of the plurality of predefined preamble sequences to produce correlation values; and where the correlation values are used to determine which one of the plurality of predefined preamble sequences is a match to the received preamble sequence.

8. The apparatus of claim 7, where the largest one of the correlation values corresponds to the matching preamble sequence.

9. The apparatus of claim 1, where the evaluation logic is configured to calculate cross-correlations between phases of the received preamble sequence and phases of the plurality of predefined preamble sequences in a frequency domain.

10. The apparatus of claim 1, where the wireless signal is an orthogonal frequency-division multiple access (OFDMA) multiplexed and binary phase shift keying (BPSK) modulated signal.

11. The apparatus of claim 1, where the wireless device is a base station.

12. A method, comprising:

receiving a first signal from a first base station at a mobile device, where the received first signal includes a first preamble sequence, wherein the first preamble sequence is expected to be received within a frequency range that is between two frequency guard bands;

evaluating the received first signal when the received first signal extends outside the frequency range and outside one of the frequency guard bands by:

(i) determining if a threshold amount of the first preamble sequence is available in the frequency range between the two frequency guard bands, and if the threshold amount is not available, then reporting a failure in identifying the received preamble sequence; and (ii) if the threshold amount is available, then (a) comparing phase information of the first preamble sequence to phase information of a plurality of predefined preamble sequences without using amplitude information from the first received signal; and (b) identifying a possible matching preamble sequence based at least in part on the phase information without using the amplitude information;

configuring the mobile device based, at least in part, on the possible matching preamble sequence to transmit and receive information with the first base station.

13. The method of claim 12, further comprising:

performing differentiation between adjacent subcarriers of the first preamble sequence to remove random channel noise and produce differentiated signals; and calculating cross-correlations between phases of the differentiated signals and the plurality of predefined preamble sequences to produce correlation values, where amplitudes of the differentiated signals are not cross correlated, and where the possible matching preamble sequence is determined based, at least in part, on the correlation values.

14. The method of claim 12, where the first preamble sequence is comprised of a stream of symbols, where when one symbol of the stream of symbols represents a plurality of bits, and where the evaluating of the first preamble sequence is based, at least in part, on the stream of symbols.

15. The method of claim 12, further comprising:

determining an integer carrier frequency offset (iCFO) when the first preamble sequence does not extend beyond the frequency guard band.

16. The method of claim 12, where evaluating the first preamble sequence comprises:

selecting a correlation value with a large magnitude, where the large magnitude exceeds a threshold value, and where the large magnitude corresponds to one of the plurality of predefined preamble sequences.

17. The method of claim 12, where the method is performed at least in part in a frequency domain.

18. The method of claim 12, further comprising:

receiving from a second base station a second signal that includes a second preamble sequence that corresponds to one of the plurality of predefined preamble sequences;

evaluating the first preamble sequence by comparing phase information of the first preamble sequence to phase information of the plurality of predefined preamble sequences to determine a first signal strength associated with the first preamble sequence;

evaluating the second preamble sequence by comparing phase information of the second preamble sequence to phase information of the plurality of predefined preamble sequences to determine a second signal strength associated with the second preamble sequence; and configuring, at least in part, the mobile device to communicate with the first base station or the second base station based, at least in part, the first signal strength and the second signal strength.

19. The method of claim 12, further comprising:

synchronizing a communications link based, at least in part, on the possible matching preamble sequence.

20. The method of claim 12, wherein the first signal is modulated with a plurality of subcarriers, and where evaluating the first preamble sequence is based, at least in part, on the plurality of subcarriers.

* * * * *